United States Patent
Hidaka

(10) Patent No.: US 10,172,220 B1
(45) Date of Patent: Jan. 1, 2019

(54) PAIRING METHOD IN ILLUMINATION SYSTEM, ILLUMINATION SYSTEM, AND ILLUMINATION CONTROLLER

(71) Applicant: Panasonic Intellectual Property Management Co., Ltd., Osaka (JP)

(72) Inventor: Yuto Hidaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/019,217

(22) Filed: Jun. 26, 2018

(30) Foreign Application Priority Data

Jul. 3, 2017 (JP) .................................. 2017-130255

(51) Int. Cl.
| H05B 37/02 | (2006.01) |
| G06F 3/0484 | (2013.01) |
| G08C 17/02 | (2006.01) |
| H04L 12/28 | (2006.01) |
| G08C 23/04 | (2006.01) |
| H04W 4/80 | (2018.01) |

(52) U.S. Cl.
CPC ..... *H05B 37/0272* (2013.01); *G06F 3/04847* (2013.01); *G08C 17/02* (2013.01); *H04L 12/2803* (2013.01); *H04L 12/2807* (2013.01); *G08C 23/04* (2013.01); *G08C 2201/93* (2013.01); *H04W 4/80* (2018.02)

(58) Field of Classification Search
CPC   H05B 33/0845; H05B 37/02; H05B 37/0272; H04L 12/2803; H04L 12/6418
USPC ............. 315/291, 292, 360; 455/404.2, 41.1, 455/41.2, 414.1
See application file for complete search history.

(56) References Cited

U.S. PATENT DOCUMENTS

| 7,532,611 | B1 * | 5/2009 | Jacks, Jr. ............... | G08C 17/00 340/10.1 |
| 8,725,113 | B2 * | 5/2014 | Gargi ...................... | H04M 1/67 380/247 |
| 9,608,725 | B2 * | 3/2017 | Aoyama .............. | H04B 10/116 |
| 9,756,666 | B2 * | 9/2017 | Makinouchi ............ | H04W 4/90 |

(Continued)

FOREIGN PATENT DOCUMENTS

JP    2016-178014 A    10/2016

*Primary Examiner* — Tung X Le
*Assistant Examiner* — Borna Alaeddini
(74) *Attorney, Agent, or Firm* — McDermott Will & Emery LLP

(57) ABSTRACT

Access devices broadcast a first command signal, and each of luminaires transmits first information as a reply to access devices. The first information includes identification information of the luminaire and a radio field intensity of the first command signal. After receiving plural pieces of the first information, each access device transmits second information to an illumination controller. The second information includes identification information of the access device and the plural pieces of the first information. The illumination controller: determines, when determining that a predetermined luminaire has transmitted the first information to only one access device, that the predetermined luminaire and the one access device are to be paired; and determines, when determining that the predetermined luminaire has transmitted the first information to the plural access devices, that the predetermined luminaire and an access device among the plural access devices which has a highest radio field intensity are to be paired.

11 Claims, 7 Drawing Sheets

(56) References Cited

U.S. PATENT DOCUMENTS

| | | | | |
|---|---|---|---|---|
| 10,075,334 B1* | 9/2018 | Kozura | ............... | H04L 41/0806 |
| 2010/0283579 A1* | 11/2010 | Kraus | ................ | G07C 9/00944 |
| | | | | 340/5.7 |
| 2011/0121654 A1* | 5/2011 | Recker | .................... | H02J 9/065 |
| | | | | 307/66 |

* cited by examiner

FIG. 7

(a) FIRST INFORMATION

| LUMINAIRE | IDENTIFICATION INFORMATION | RADIO FIELD INTENSITY |
|---|---|---|
| 1 | AA·· | 5 |

(b) SECOND INFORMATION

| | | ACCESS DEVICE 21, IDENTIFICATION X |
|---|---|---|
| LUMINAIRE | IDENTIFICATION INFORMATION | RADIO FIELD INTENSITY |
| 1 | AA·· | 5 |
| 2 | BB·· | 20 |
| 3 | CC·· | 40 |
| 4 | DD·· | 30 |
| 5 | EE·· | 20 |
| 6 | FF·· | 5 |

(c) A PLURALITY OF PIECES OF SECOND INFORMATION

| | | ACCESS DEVICE 21, IDENTIFICATION X | ACCESS DEVICE 22, IDENTIFICATION Y |
|---|---|---|---|
| LUMINAIRE | IDENTIFICATION INFORMATION | RADIO FIELD INTENSITY | RADIO FIELD INTENSITY |
| 1 | AA·· | 5 | — |
| 2 | BB·· | 20 | — |
| 3 | CC·· | 40 | — |
| 4 | DD·· | 30 | 5 |
| 5 | EE·· | 20 | 22 |
| 6 | FF·· | 5 | 30 |
| 7 | GG·· | — | 35 |
| 8 | HH·· | — | 20 |
| 9 | II·· | — | 10 |
| 10 | JJ·· | — | 23 |

PAIRING METHOD IN ILLUMINATION SYSTEM, ILLUMINATION SYSTEM, AND ILLUMINATION CONTROLLER

CROSS REFERENCE TO RELATED APPLICATION

This application claims the benefit of priority of Japanese Patent Application Number 2017-130255 filed on Jul. 3, 2017, the entire content of which is hereby incorporated by reference.

BACKGROUND

1. Technical Field

The present disclosure relates to: an illumination system including luminaires, access devices, and an illumination controller; a pairing method in the illumination system; and the illumination controller.

2. Description of the Related Art

Conventionally, an illumination system including a plurality of luminaires and a plurality of access devices that communicate with the plurality of luminaires by radio waves has been known (see Japanese Unexamined Patent Application Publication No. 2016-178014 (Patent Literature (PTL) 1)). With this type of illumination system, pairing between the plurality of access devices and the plurality of luminaires is performed using radio waves after the luminaires and the access devices are installed in, for example, a building part of a building.

SUMMARY

However, the region that the radio waves emitted from the access devices can reach is limited. Moreover, a total number of luminaires which can be connected to one access device is also limited. Therefore, an operator who conducts the pairing operation needs to conduct the pairing operation while checking the radio wave condition between the luminaires and the access devices as well as a total number of luminaires connected to the access devices, which requires an enormous amount of effort.

In view of this, the present disclosure provides a pairing method in an illumination system etc. that enable efficient pairing between luminaires and access devices.

A pairing method in an illumination system according to an aspect of the present disclosure is a pairing method in an illumination system including: a plurality of luminaires; a plurality of access devices; and an illumination controller that communicates with the plurality of access devices. The pairing method includes broadcasting, by each of the plurality of access devices, a first command signal to parts of the plurality of luminaires, the first command signal commanding each of the parts of the plurality of luminaires that receive the first command signal to transmit information regarding the each of the parts of the plurality of luminaires as a reply. The pairing method also includes receiving, by each of the plurality of luminaires, one or more command signals including the first command signals broadcasted from one or more access devices. The pairing method also includes, after receiving the first command signal, transmitting, by each of the plurality of luminaires, first information as the reply to one or more access devices among the plurality of access devices, each of which has broadcasted the first command signal, the first information including identification information of the each of the plurality of luminaires and a radio field intensity of the first command signal received by the each of the plurality of luminaires. The pairing method also includes, after receiving a plurality of pieces of the first information, transmitting, by each of the plurality of access devices, second information to the illumination controller, the second information including identification information of each of the plurality of access devices and the plurality of pieces of the first information received by the each of the plurality of access devices. The pairing method also includes, after receiving a plurality of pieces of the second information, pairing, by the illumination controller, based on the plurality of pieces of the second information, each of the plurality of luminaires and one of the plurality of access devices. In the pairing, the illumination controller determines whether a given luminaire to be paired has transmitted the first information to only one access device or to two or more access devices, among the plurality of access devices. When it is determined that the given luminaire to be paired has transmitted the first information to only one access device included in the plurality of access devices, the illumination controller determines to pair the given luminaire and the one access device. When it is determined that the given luminaire to be paired has transmitted the first information to the two or more access devices included in the plurality of access devices, the illumination controller determines to pair the given luminaire and one access device included in the two or more access devices which has a highest radio field intensity.

An illumination system according to an aspect of the present disclosure is an illumination system including: a plurality of luminaires; a plurality of access devices that wirelessly communicate with the plurality of luminaires; and an illumination controller that communicates with the plurality of access devices. Each of the plurality of luminaires includes: a communication unit configured to communicate with one or more access devices included in the plurality of access devices; and a controller that transmits, to the one or more access devices via the communication unit of the luminaire, first information including identification information of the luminaire and a radio field intensity of a signal broadcasted from the one or more access devices. Each of the plurality of access devices includes: a communication unit configured to communicate with the illumination controller; and a controller that transmits, to the illumination controller via the communication unit of the access device, second information including identification information of the access device and a plurality of pieces of the first information. The illumination controller includes: a communication unit configured to communicate with the plurality of access devices; and a controller that determines, based on a plurality of pieces of the second information obtained via the communication unit of the illumination controller, whether or not a predetermined luminaire included in the plurality of luminaires has transmitted the first information to two or more access devices included in the plurality of access devices, determines, when determining that the predetermined luminaire has transmitted the first information to only one access device included in the plurality of access devices, that the predetermined luminaire and the one access device are to be paired, and determines, when determining that the predetermined luminaire has transmitted the first information to the two or more access devices included in the plurality of access devices, that the predetermined luminaire and an access device included in the two or more access devices which has a highest radio field intensity are to be paired.

An illumination controller according to an aspect of the present disclosure is an illumination controller that communicates with a plurality of access devices that wirelessly communicate with a plurality of luminaires.

The illumination controller includes a communication unit configured to receive, from the plurality of access devices, a plurality of pieces of second information that include (i) a plurality of pieces of first information that include (i-1) identification information of each of the plurality of luminaires and (i-2) radio field intensities of signals broadcasted from the plurality of access devices to the plurality of luminaires, and (ii) identification information of each of the plurality of access devices. The illumination controller also includes a controller that: determines, based on the plurality of pieces of the second information obtained via the communication unit, whether or not a predetermined luminaire included in the plurality of luminaires has transmitted the first information to two or more access devices included in the plurality of access devices; determines, when determining that the predetermined luminaire has transmitted the first information to only one access device included in the plurality of access devices, that the predetermined luminaire and the one access device are to be paired; and determines, when determining that the predetermined luminaire has transmitted the first information to the two or more access devices included in the plurality of access devices, that the predetermined luminaire and one access device included in the two or more access devices which has a highest radio field intensity are to be paired.

It is possible to efficiently perform pairing between luminaires and access devices in an illumination system.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 7 is a diagram illustrating information for determining a pairing partner in the pairing method in the illumination system according to the embodiment.

DETAILED DESCRIPTION OF THE EMBODIMENT(S)

Hereinafter, an illumination system and a pairing method in an illumination system according to an embodiment will be described with reference to the drawings. Note that the embodiment described below illustrates a specific example of the present disclosure. Thus, the numerical values, shapes, materials, structural elements, the arrangement and connection of the structural elements, etc. presented in the embodiment below are mere examples and do not limit the present disclosure. As such, among the structural elements in the embodiment below, structural elements not recited in any one of the independent claims defining the most generic concepts of the present disclosure are described as optional structural elements.

Note also that each figure is a schematic illustration and not necessarily a precise illustration. Throughout the figures, the same reference signs are given to essentially the same structural elements, and redundant description is omitted or simplified.

Embodiment

[1-1. Overall Configuration of Illumination System]

Figure 1:
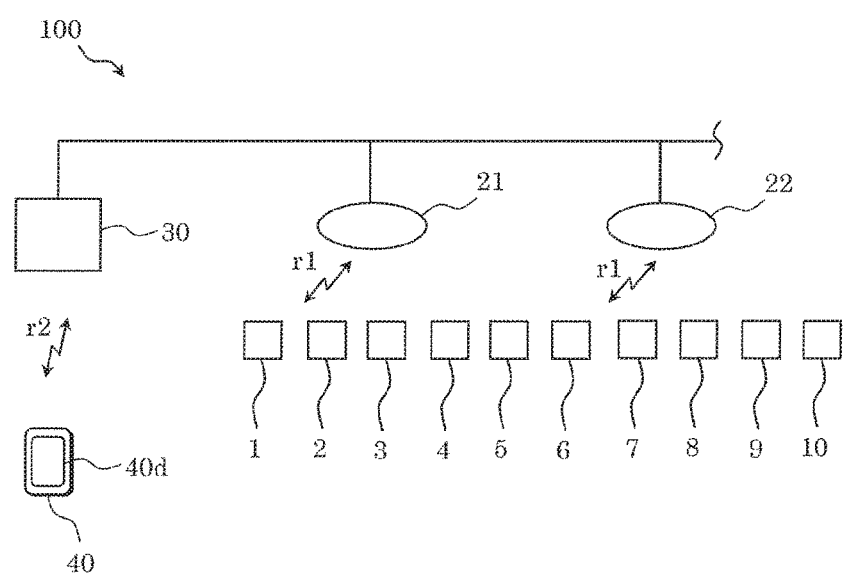
FIG. 1 is a schematic diagram illustrating an illumination system according to an embodiment, and luminaires, access devices, and an illumination controller included in the illumination system.

FIG. 1 is a diagram illustrating illumination system 100 according to an embodiment.

Illumination system 100 includes a plurality of luminaires 1, 2, 3, 4, 5, 6, 7, 8, 9, and 10, a plurality of access devices 21 and 22 that wirelessly communicate with one or more luminaires included in luminaires 1 to 10, and illumination controller 30 that communicates with the plurality of access devices 21 and 22. Further, illumination system 100 includes operation terminal 40 that communicates with illumination controller 30.

Note that although FIG. 1 illustrates ten luminaires 1 to 10 as an example, in reality, a hundred or more luminaires may be installed in a building part (such as a ceiling). Further, although FIG. 1 illustrates two access devices 21 and 22 as an example, in reality, three or more access devices may be installed in a building part, for example.

First, with reference to FIG. 1, the following describes communication connections among the plurality of luminaires 1 to 10, the plurality of access devices 21 and 22, and illumination controller 30 that are included in illumination system 100. The following also describes a communication connection between illumination controller 30 and operation terminal 40.

The plurality of luminaires 1 to 10 and the plurality of access devices 21 and 22 can communicate with one another by radio r1. The communication scheme for radio r1 is, for example, specified low power radio that uses a 920 MHz band or 2.4 GHz band frequency, Zigbee (registered trademark), Bluetooth (registered trademark), or WiFi (registered trademark).

Nonetheless, the region that the radio waves emitted from access device 21 can reach and the region that the radio waves emitted from access device 22 can reach are limited, and, before pairing settings are made, illumination system 100 is not aware of which of access devices 21 and 22 can communicate with which of luminaires 1 to 10. Pairs of access devices 21 and 22 and luminaires 1 to 10 that can communicate with each other become known during execution of the pairing method in illumination system 100.

Note that access devices 21 and 22 and illumination controller 30 can communicate with each other via wired communication. Illumination controller 30 and operation terminal 40 can communicate with each other by radio r2. The communication scheme for radio r2 is the same as that for radio r1. Wired communication between illumination controller 30 and operation terminal 40 may be enabled through the use of a connection terminal such as a universal serial bus (USB).

[1-2. Each Structural Element of Illumination System]

Figure 2:
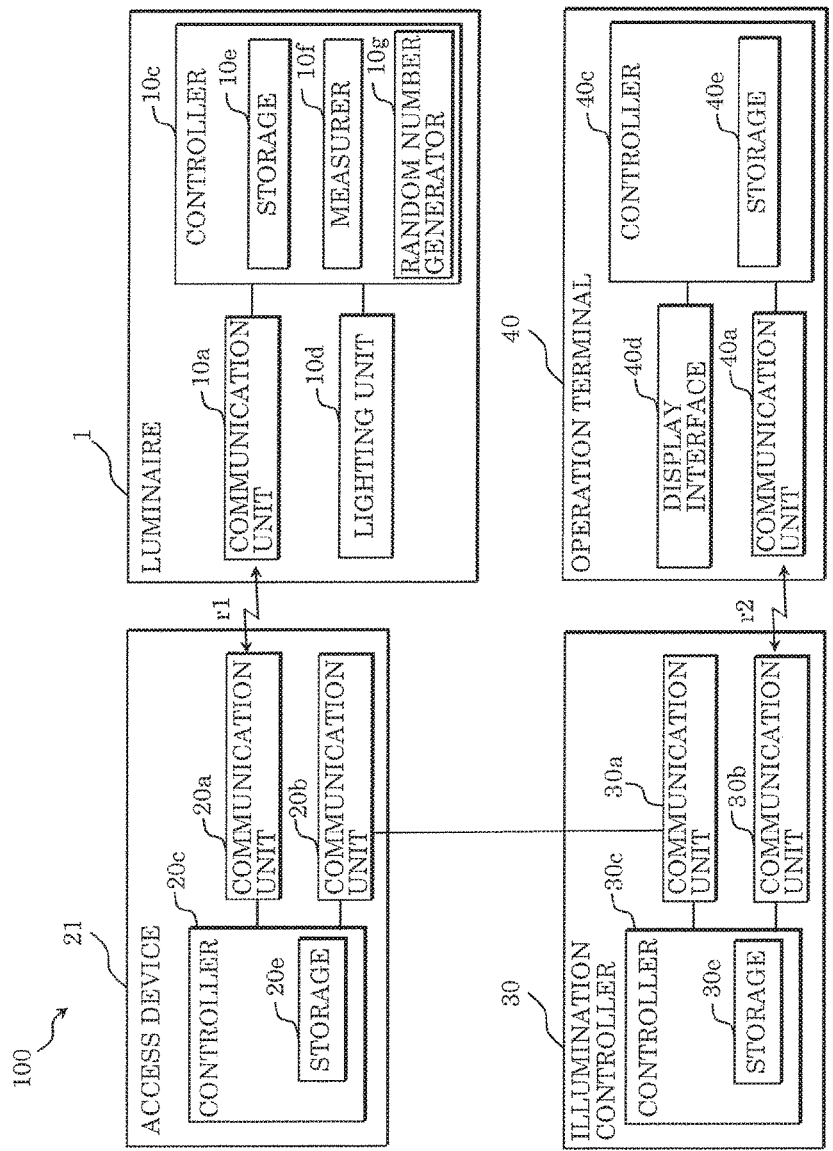
FIG. 2 is a block diagram illustrating the illumination system according to the embodiment.

FIG. 2 is a block diagram illustrating a configuration of illumination system 100. Here, among the plurality of luminaires 1 to 10, luminaire 1 is described as a representative example. Further, among the plurality of access devices 21 and 22, access device 21 is described as a representative example.

Luminaire 1 is, for example, a light-emitting diode (LED) light. Luminaire 1 includes communication unit 10a, lighting unit 10d, and controller 10c connected to communication unit 10a and lighting unit 10d.

Communication unit 10a includes an antenna and a wireless module, for example. Communication unit 10a communicates with access device 21 by radio r1.

Lighting unit 10d includes a light source such as a plurality of light-emitting diodes that emit, for example, white light, red light, green light, or blue light.

Controller 10c includes a central processing unit (CPU), for example. Controller 10c controls the light emission state of lighting unit 10d based on a command from illumination controller 30, for example.

Controller 10c includes storage 10e that includes random access memory (RAM) and read only memory (ROM), for example. Storage 10e stores identification information of luminaire 1 itself such as a media access control (MAC) address.

Controller 10c also includes measurer 10f that measures the radio field intensity (for example, received signal strength indicator (RSSI)). Based on a first command signal transmitted from access device 21, measurer 10f measures the radio field intensity of the first command signal itself. The first command signal commands luminaire 1 to transmit information regarding luminaire 1 as a reply.

After receiving the first command signal, controller 10c transmits, as the information regarding luminaire 1, first information (see (a) of FIG. 7) including the radio field intensity measured and the identification information of luminaire 1, to access device 21 via communication unit 10a.

Controller 10c also includes random number generator 10g for determining timing at which the first information is to be transmitted as a reply. After receiving the first command signal, random number generator 10g generates a random number in a range from 0 to 1023, for example. Controller 10c transmits the first information as a reply at the timing corresponding to the numerical value generated. By using random number generator 10g in such a manner, luminaire 1 and another luminaire (for example, luminaire 2) do not simultaneously transmit the first information as a reply. Note that when luminaire 1 and another luminaire 2 have simultaneously transmitted the first information as a reply, access device 21 broadcasts the first command signal to each of the luminaires which have simultaneously transmitted the first information, so as to cause the luminaires to generate a random number again.

Access device 21 is, for example, a wireless controller or a wireless adapter. Access device 21 includes communication unit 20a that communicates with luminaire 1, communication unit 20b that communicates with illumination controller 30, and controller 20c connected to communication unit 20a and communication unit 20b.

Communication units 20a and 20b each include an antenna and a wireless module, for example. Communication unit 20a communicates with luminaire 1 by radio r1, and communication unit 20b communicates with illumination controller 30 via wired communication.

Controller 20c includes a CPU, for example. Controller 20c receives, via communication unit 20b, a start signal transmitted from illumination controller 30. The start signal is for starting determination of a pairing partner for each of access devices 21 and 22 and each of luminaires 1 to 10. After receiving the start signal, controller 20c broadcasts the first command signal to luminaire 1 via communication unit 20a.

Controller 20c includes storage 20e that includes RAM and ROM, for example. Storage 20e stores identification information of access device 21 itself, such as a MAC address.

Controller 20c holds, in storage 20e, a plurality of pieces of the first information broadcasted from a plurality of luminaires (for example, luminaires 1 to 6). Further, controller 20c transmits second information (see (b) of FIG. 7) including the plurality of pieces of the first information and the identification information of access device 21 to illumination controller 30 via communication unit 20b.

Illumination controller 30 makes settings or performs control regarding a lighting operation of luminaires 1 to 10 via access devices 21 and 22. Illumination controller 30 is a master controller that performs overall control on access devices 21 and 22, and is aware of a total number of access devices connected to illumination controller 30. Although illumination controller 30 illustrated in FIG. 1 is, for example, a stationary computer terminal, illumination controller 30 is not limited to this. Illumination controller 30 may be a portable computer terminal.

Illumination controller 30 includes communication unit 30a, communication unit 30b, and controller 30c connected to communication unit 30a and communication unit 30b.

Communication unit 30a is connected with access device 21 via a wire. Note that communication unit 30a and access device 21 may be capable of wireless communication with each other. Communication unit 30b communicates with operation terminal 40 by radio r2.

Controller 30c includes a CPU, for example, and controls the light emission state of luminaire 1 via access device 21. Controller 30c includes storage 30e that includes RAM and ROM, for example.

After receiving a plurality of pieces of the second information via communication unit 30a, controller 30c in the present embodiment determines a pairing partner based on the plurality of pieces of the second information. Specifically, controller 30c determines whether or not a predetermined luminaire included in the plurality of luminaires 1 to 10 has transmitted the first information to a plurality of access devices. When determining that the predetermined luminaire (for example, luminaire 1) has transmitted the first information to only one access device (for example, access device 21), controller 30c determines that predetermined luminaire 1 and one access device 21 are to be paired. Further, when determining that the predetermined luminaire (for example, luminaire 4) has transmitted the first information to two or more access devices (for example, access devices 21 and 22), controller 30c determines that predetermined luminaire 4 and an access device included in two or more access devices 21 and 22 which has the highest radio field intensity (for example, access device 21) are to be paired. With this configuration, illumination system 100 can efficiently perform pairing between the plurality of luminaires 1 to 10 and the plurality of access devices 21 and 22.

Operation terminal 40 includes communication unit 40a, display interface 40d, and controller 40c connected to communication unit 40a and display interface 40d.

Communication unit 40a communicates with illumination controller 30 by radio r2. Display interface 40d is a touch panel, for example, and receives an operation input from an operator and displays a radio wave condition or a pairing relationship of illumination system 100. Note that the pairing operation in the present embodiment is performed almost automatically, and the operator enters an operation input into display interface 40d once at the time of starting the pairing operation.

Controller 40c includes a CPU and transmits, to illumination controller 30 via communication unit 40a, a command which is input by key entry using display interface 40d. Controller 40c includes storage 40e that includes RAM and ROM, for example. Controller 40c displays, on display interface 40d, the information regarding luminaire 1 and access device 21 transmitted from illumination controller 30. For example, controller 40c outputs an error display to display interface 40d when there is no appropriate pairing partner.

Note that operation terminal 40 is not a compulsory structural element in illumination system 100, and, for example, illumination controller 30 may have functions that are the same as or similar to the functions of controller 40c and display interface 40d.

[1-3. Pairing Method in Illumination System]

First, constraints of illumination system 100 are described using an example. As described above, with illumination system 100, the region that the radio waves emitted from access device 21 can reach and the region that the radio waves emitted from access device 22 can reach are limited, and a total number of luminaires which can be connected to access device 21 and a total number of luminaires which can be connected to access device 22 are limited.

Figure 3:
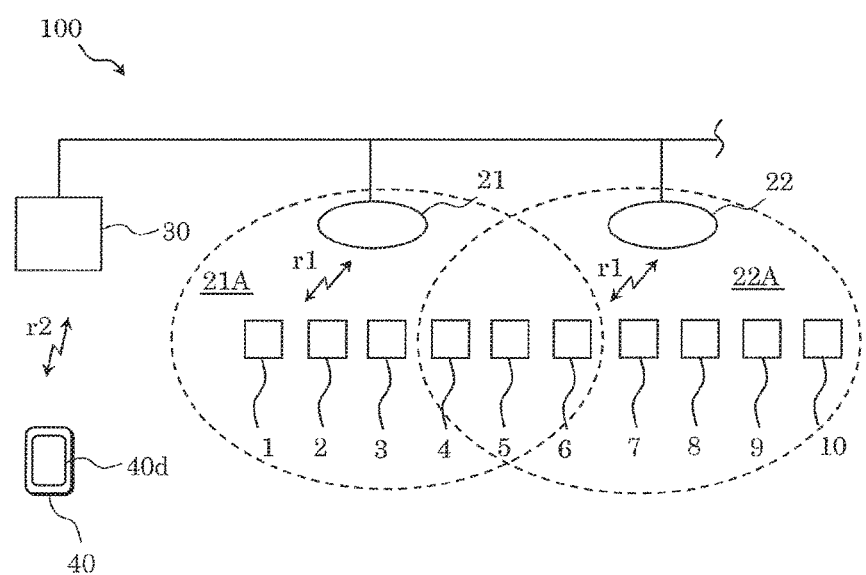
FIG. 3 is a diagram illustrating an example of regions that radio waves emitted from the access devices in the illumination system according to the embodiment can reach and total numbers of luminaires which can be connected to the access devices.

FIG. 3 is a diagram illustrating an example of regions that the radio waves emitted from access devices 21 and 22 in illumination system 100 can reach, and a total number of luminaires which can be connected to access device 21 and a total number of luminaires which can be connected to access device 22.

In FIG. 3, the region that the radio waves emitted from access device 21 can reach is region 21A, and the region that the radio waves emitted from access device 22 can reach is region 22A. In the present embodiment, among luminaires 1 to 10, luminaires 1 to 6 can communicate with access device 21 and luminaires 4 to 10 can communicate with access device 22. Further, in the present embodiment, a total number of luminaires which can be connected to access device 21 is five, and a total number of luminaires which can be connected to access device 22 is five.

Under the above constraints, an example of a pairing method in illumination system 100 is described.

Figure 4:
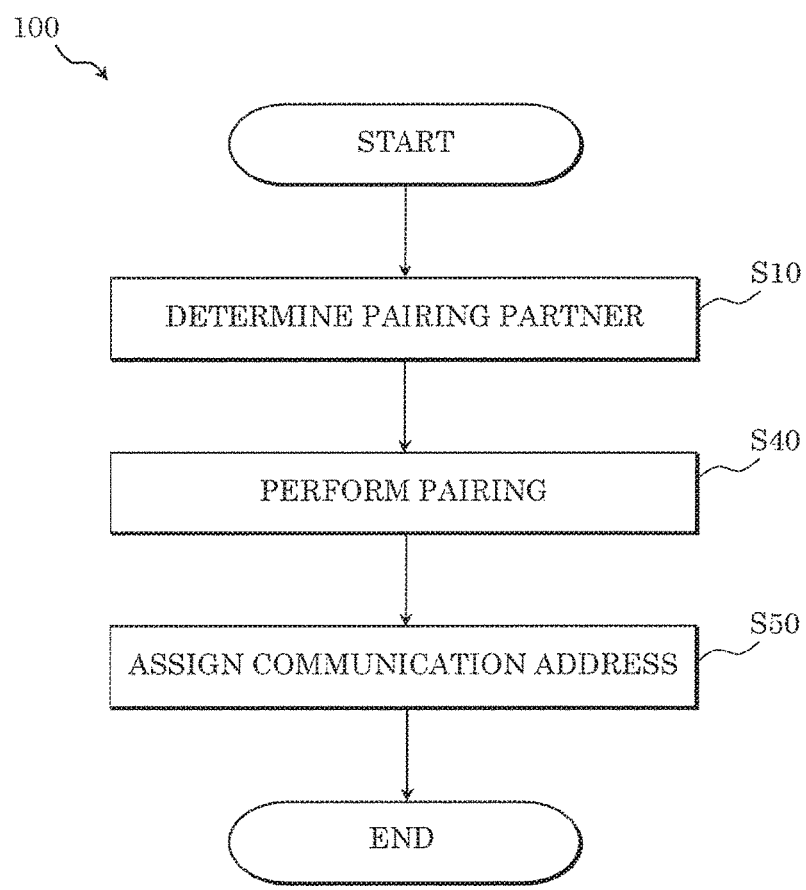
FIG. 4 is an overall flow chart illustrating a pairing method in the illumination system according to the embodiment.

FIG. 4 is an overall flow chart illustrating a pairing method in illumination system 100.

The pairing method in illumination system 100 includes determination of a pairing partner (S10), pairing (S40), and assignment of a communication address to each of luminaires 1 to 10 (S50).

First, the determination of a pairing partner (S10) is described.

Figure 5:
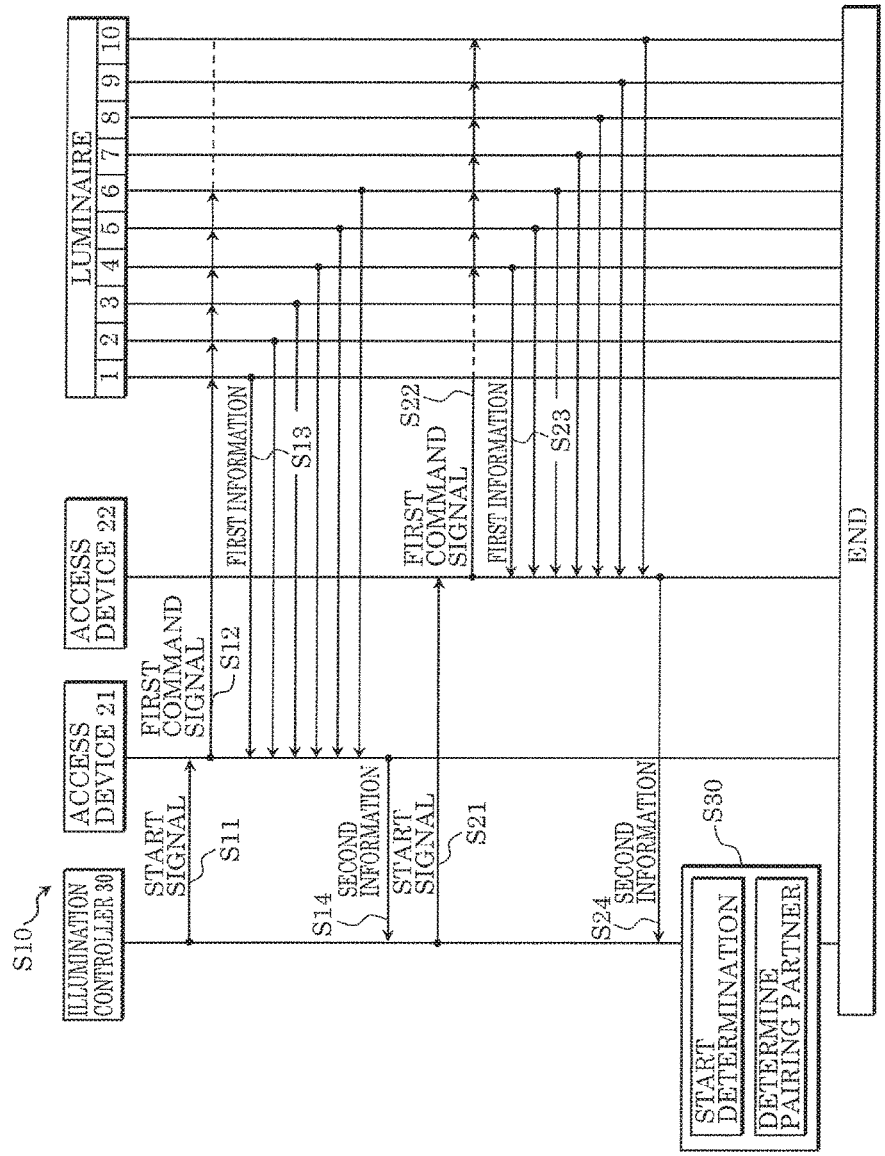
FIG. 5 is a sequence diagram for explaining determination of a pairing partner, included in the overall flow chart illustrated in FIG. 4.
Figure 6:
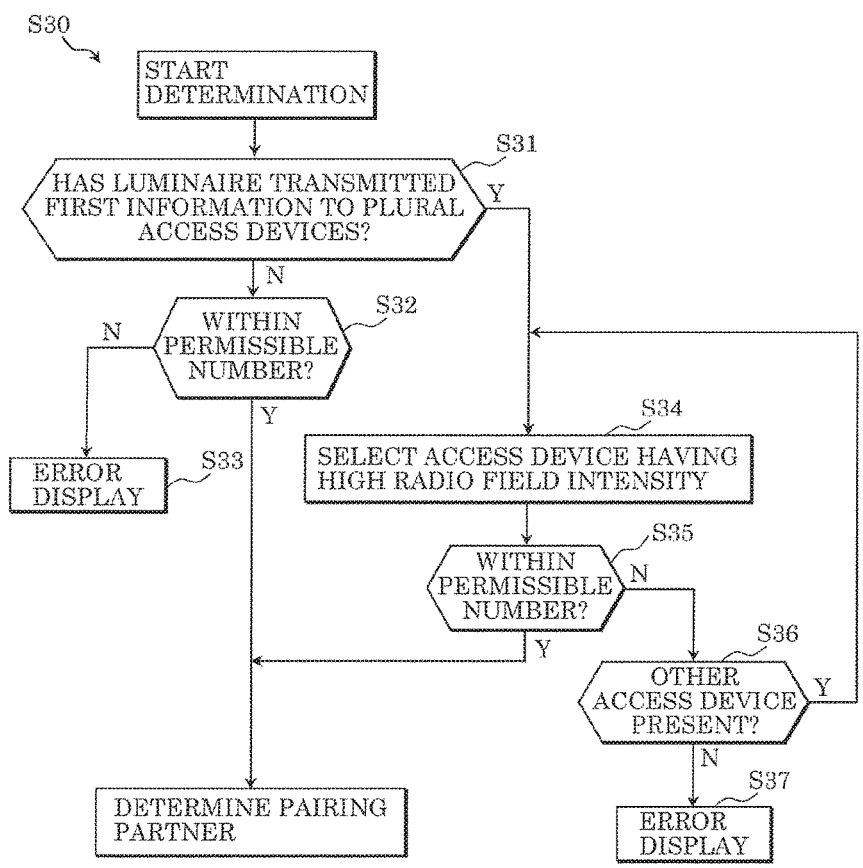
FIG. 6 is a flow chart specifically illustrating a method for determining a pairing partner, included in the sequence diagram illustrated in FIG. 5.

FIG. 5 is a sequence diagram for explaining the determination of a pairing partner in S10. FIG. 6 is a flow chart specifically illustrating a method for determining a pairing partner. FIG. 7 is a diagram illustrating information used for determining a pairing partner.

First, as illustrated in FIG. 5, illumination controller 30 transmits the start signal to access device 21 (S11). The start signal is input through a key operation on operation terminal 40, for example.

After receiving the start signal, access device 21 broadcasts the first command signal that commands luminaires 1 to 10 to transmit, as a reply, information regarding luminaires 1 to 10 (S12). Luminaires 1 to 6 of illumination system 100 that are located in region 21A receive the first command signal.

Luminaires 1 to 6 each measure the radio field intensity of the first command signal received. Each of luminaires 1 to 6 transmits the first information including the radio field intensity measured and the identification information of the luminaire itself to access device 21 as a reply (S13).

The timing at which the first information is to be transmitted as a reply is determined according to the random number generated by random number generator 10g of each of luminaires 1 to 6. For example, in the case where random numbers 10, 20, 30, 40, 50, and 60 are sequentially generated by luminaires 1, 2, 3, 4, 5, and 6, respectively, luminaires 1, 2, 3, 4, 5, and 6 sequentially transmit the first information as a reply 10 ms, 20 ms, 30 ms, 40 ms, 50 ms, and 60 ms after receiving the first command signal, respectively.

Access device 21 holds, in storage 20e, a plurality of pieces of the first information transmitted as a reply, and transmits, to illumination controller 30, the second information including the plurality of pieces of the first information and the identification information of the access device itself (S14).

Further, after checking the first information transmitted as a reply from each of luminaires 1 to 6, access device 21 transmits a reception signal to each of luminaires 1 to 6 (not illustrated). Each of luminaires 1 to 6 that has received the reception signal holds a reply completion flag in storage 10e of the luminaire itself. The reply completion flag is a sign indicating that the first information has been transmitted to access device 21 as a reply. Luminaires 1 to 6 holding the reply completion flag change the light emission state, e.g., from a 100% light emission state to a 5% light emission state.

After receiving the second information from access device 21, illumination controller 30 transmits the start signal to access device 22 this time (S21).

After receiving the start signal, access device 21 broadcasts the first command signal that commands luminaires 1 to 10 to transmit, as a reply, the information regarding luminaires 1 to 10 (S22). Luminaires 4 to 10 of illumination system 100 that are located in region 22A receive the first command signal.

Each of luminaires 4 to 10 measures the radio field intensity of the first command signal received. Each of luminaires 4 to 10 transmits the first information including the radio field intensity measured and the identification information of the luminaire itself to access device 22 as a reply (S23).

Access device 22 holds, in storage 20e, a plurality of pieces of the first information transmitted as a reply, and transmits, to illumination controller 30, the second information including the plurality of pieces of the first information and the identification information of the access device itself (S24).

Further, after checking the first information transmitted from each of luminaires 4 to 10 as a reply, access device 22 transmits a reception signal to each of luminaires 4 to 10 (not illustrated). Each of luminaires 4 to 10 that has received the reception signal holds a reply completion flag in storage 10e of the luminaire itself. Among luminaires 4 to 10 holding the reply completion flag, for example, luminaires 7 to 10 that are in the 100% light emission state change the light emission state to the 5% light emission state.

After receiving a plurality of pieces of the second information transmitted from access devices 21 and 22, illumination controller 30 determines a pairing partner based on the plurality of pieces of the second information (S30).

Specifically, as illustrated in FIG. 6, illumination controller 30 determines whether or not a predetermined luminaire (for example, luminaire 1) included in the plurality of luminaires 1 to 10 has transmitted the first information to the plurality of access devices 21 and 22 (S31). Then, when determining that the predetermined luminaire has transmitted the first information to only one access device (N in S31), illumination controller 30 determines that the predetermined luminaire and the one access device are to be paired. For example, illumination controller 30 determines, based on the plurality of pieces of the second information illustrated in (c) of FIG. 7, that each of luminaires 1, 2, and 3 has transmitted the first information to access device 21 only, and thus determines that each of luminaires 1 to 3 is to be paired with access device 21. Further, illumination controller 30 determines that each of luminaires 7, 8, 9, and 10 has transmitted the first information to access device 22 only, and thus determines that each of luminaires 7 to 10 is to be paired with access device 22.

Note that illumination controller 30 determines pairs between luminaires 1 to 3 and access device 21 based on determination as to whether or not the total number of luminaires (luminaires 1 to 3) connected to access device 21 is within a permissible number (S32). Further, illumination controller 30 determines pairs between luminaires 7 to 10 and access device 22 based on determination as to whether or not the total number of luminaires (luminaires 7 to 10) connected to access device 22 is within a permissible number (S32). Then, when the total number of luminaires connected is within the permissible number (Y in S32), illumination controller 30 determines that the predetermined luminaire and the one access device are to be paired.

For example, while the permissible number for access device 21 is five, three luminaires 1 to 3 are within the permissible number. Therefore, illumination controller 30 determines that each of luminaires 1 to 3 is to be paired with access device 21. Further, for example, while the permissible number for access device 22 is five, four luminaires 7 to 10 is within the permissible number. Therefore, illumination controller 30 determines that each of luminaires 7 to 10 is to be paired with access device 22. On the other hand, when the total number of luminaires connected is not within the permissible number (N in S32), illumination controller 30 outputs an error signal and causes, for example, display interface 40d of operation terminal 40 to output an error display (S33).

In such a manner as described, in determining a pairing partner, illumination controller 30 gives a higher priority to luminaires 1 to 3 and 7 to 10 that correspond one-to-one with access devices 21 and 22 in communication than to luminaires 4 to 6 that do not correspond one-to-one with access devices 21 and 22 in communication. The following describes a method for determining a pairing partner for remaining luminaires 4 to 6 that do not correspond one-to-one with access devices 21 and 22 in communication.

As illustrated in FIG. 6, when determining in Step S31 that a predetermined luminaire (for example, luminaire 4) has transmitted the first information to the plurality of access devices 21 and 22 (Y in S31), illumination controller 30 determines that predetermined luminaire 4 is to be paired with an access device having a higher radio field intensity (for example, access device 21) (S34).

For example, illumination controller 30 determines that each of luminaires 4, 5, and 6 has transmitted the first information to the plurality of access devices 21 and 22, based on the plurality of pieces of the second information illustrated in (c) of FIG. 7. Then, for luminaire 4, illumination controller 30 determines, from among access devices 21 and 22, access device 21 which has a highest radio field intensity, as a pairing partner, and for luminaires 5 and 6, illumination controller 30 determines, from among access devices 21 and 22, access device 22 which has a highest radio field intensity, as a pairing partner.

Further, in doing so, of luminaires 5 and 6, illumination controller 30 preferentially determines, as a pairing partner, a luminaire having a higher radio field intensity with respect to access device 22. Specifically, the radio field intensity of luminaire 5 is 22 whereas the radio field intensity of luminaire 6 is 30, and thus, luminaire 6 having a higher radio field intensity with respect to access device 22 is determined as a pairing partner having a higher priority.

Furthermore, illumination controller 30 determines pairs between luminaires 4 to 6 and access devices 21 and 22 based on determination as to whether or not the total number of luminaires connected to access device 21 or 22 is within a permissible number (S35). Then, when the total number of luminaires connected is within the permissible number (Y in S35), illumination controller 30 determines a pairing partner in the manner as described above.

For example, while the permissible number for access device 21 is now two, the total number of luminaire 4, namely one, is within the permissible number. Therefore, illumination controller 30 determines that luminaire 4 is to be paired with access device 21. Further, for example, while the permissible number for access device 22 is now one, the total number of luminaires 5 and 6, namely two, is not within the permissible number. Therefore, illumination controller 30 determines that luminaire 6, which is given a higher priority, is to be paired with access device 22. As for luminaire 5, pairing with access device 22 would cause the total number of luminaires connected to access device 22 to exceed the permissible number. Therefore, illumination controller 30 does not determine that luminaire 5 is to be paired with access device 22.

In view of this, when the total number of luminaires connected to access device 22 exceeds the permissible number (N in S35), illumination controller 30 determines whether or not another access device with which communication can be performed is present (S36). In the present embodiment, illumination controller 30 determines that access device 21 is present as another access device with which communication can be performed (Y in S36), and returns to Step S34. Then, illumination controller 30 determines that luminaire 5 is to be paired with, of access devices 21 and 22 with which communication can be performed, access device 21 having a second highest radio field intensity, rather than access device 22 whose permissible number is exceeded.

Furthermore, when the total number of luminaires connected to access device 21 is within the permissible number in Step S35 (Y in S35), illumination controller 30 determines that luminaire 5 is to be paired with access device 21. For example, while the permissible number for access device 21 is now one, the total number of luminaire 5, namely one, is within the permissible number. Therefore, illumination controller 30 determines that luminaire 5 is to be paired with access device 21.

Note that when the total number of luminaires connected is not within the permissible number in Step S35 (N in S35) and another access device with which communication can be performed is not present (N in S36), illumination controller 30 outputs an error signal and causes, for example, display interface 40*d* of operation terminal 40 to output an error display (S37).

As described above, through the sequence illustrated in FIG. 5 and the flow illustrated in FIG. 6, pairing partners of luminaires 1 to 10 and access devices 21 and 22 are determined.

After the pairing partners are determined, pairing is performed as illustrated in FIG. 4 (S40). Specifically, illumination controller 30 transmits a pairing start command to each of access devices 21 and 22. Receiving the pairing start command, access device 21 performs pairing with luminaires 1 to 5 determined as the pairing partners. Further, access device 22 performs pairing with luminaires 6 to 10 determined as the pairing partners.

Next, as illustrated in FIG. 4, illumination controller 30 assigns a communication address to each of luminaires 1 to 10 via access devices 21 and 22 (S50). Specifically, illumination controller 30 assigns a short address, which is smaller than a MAC address in the number of bits, to each of luminaires 1 to 10. While a MAC address has 48 bits, a communication address has 8 to 16 bits, for example. By using such communication addresses having a smaller number of bits for communication between luminaires 1 to 10 and access devices 21 and 22, it is possible to increase the communication speed. Note that the number of bits of each of these communication addresses is a value determined according to the total number of luminaires.

When a communication address is assigned to each of luminaires 1 to 10, luminaires 1 to 10 change the light emission state from the 5% light emission state back to the 100% light emission state. With this change in the light emission state, it is possible to visually recognize that the communication addresses have been assigned.

Furthermore, in the present embodiment, after illumination controller 30 transmits the pairing start signal, no particular operation is necessary for illumination controller 30 and operation terminal 40, and the pairing can be performed automatically. Since the pairing can be performed through a one-touch operation, it is possible to increase the operation efficiency of the pairing in illumination system 100.

[1-4. Advantageous Effects Etc.]

A pairing method in illumination system 100 according to the present embodiment is a pairing method in illumination system 100 including: a plurality of luminaires 1-10; a plurality of access devices 21 and 22; and illumination controller 30 that communicates with the plurality of access devices 21 and 22. The pairing method includes broadcasting, by each of the plurality of access devices, a first command signal to parts of the plurality of luminaires 1-10, the first command signal commanding each of the parts of the plurality of luminaires that receive the first command signal to transmit information regarding the each of the parts of the plurality of luminaires as a reply. The pairing method also includes receiving, by each of the plurality of luminaires, one or more command signals including the first command signals broadcasted from one or more access devices. The pairing method also includes, after receiving the first command signal, transmitting, by each of the plurality of luminaires, first information as the reply to one or more access devices among the plurality of access devices 21 and 22, each of which has broadcasted the first command signal, the first information including identification information of the each of the plurality of luminaires and a radio field intensity of the first command signal received by the each of the plurality of luminaires. The pairing method also includes, after receiving a plurality of pieces of the first information, transmitting, by each of the plurality of access devices, second information to illumination controller 30, the second information including identification information of each of the plurality of access devices and the plurality of pieces of the first information received by the each of the plurality of access devices. The pairing method also includes, after receiving a plurality of pieces of the second information, pairing, by illumination controller 30, based on the plurality of pieces of the second information, each of the plurality of luminaires and one of the plurality of access devices 21 and 22. In the pairing, illumination controller 30 determines whether a given luminaire to be paired has transmitted the first information to only one access device or to two or more access devices, among the plurality of access devices 21 and 22. When it is determined that the given luminaire to be paired has transmitted the first information to only one access device included in the plurality of access devices 21 and 22, illumination controller 30 determines to pair the given luminaire and the one access device. When it is determined that the given luminaire to be paired has transmitted the first information to the two or more access devices included in the plurality of access devices 21 and 22, illumination controller 30 determines to pair the given luminaire and one access device included in the two or more access devices 21 and 22 which has a highest radio field intensity.

As described above, with the pairing method in illumination system 100, illumination controller 30 determines whether or not a predetermined luminaire has transmitted the first information to the plurality of access devices 21 and 22, and determines a pairing partner according to a result of the determination. As such, it is possible to efficiently perform pairing between luminaires 1 to 10 and access devices 21 and 22. For example, as for luminaires 1 to 3 that correspond one-to-one with access device 21 in communication and luminaires 7 to 10 that correspond one-to-one with access device 22 in communication, the access device corresponding one-to-one is automatically determined as a pairing partner. Further, for example, as for luminaires 4 to 6 that do not correspond one-to-one with an access device, a pairing partner is automatically determined according to the radio field intensity. As such, it is possible to efficiently perform pairing between luminaires 1 to 10 and access devices 21 and 22.

Further, illumination controller 30 may pair the given luminaire and the one access device, after determining that a total number of luminaires that are connected to the one access device is within a permissible number.

As described above, illumination controller 30 determines a pairing partner after ensuring that the total number of luminaires connected is within the permissible number. As such, it is possible to efficiently perform pairing between luminaires 1 to 10 and access devices 21 and 22.

Further, illumination controller 30 may pair the given luminaire and the one access device having the highest radio field intensity, after determining that a total number of luminaires that are connected to the one access device having the highest radio field intensity is within a permissible number.

As described above, illumination controller 30 determines a pairing partner after ensuring that the total number of luminaires connected is within the permissible number. As such, it is possible to efficiently perform pairing between luminaires 1 to 10 and access devices 21 and 22.

Further, when it is determined that the given luminaire to be paired has transmitted the first information to the two or more access devices included in the plurality of access devices, illumination controller 30 may pair the given luminaire and an access device, among the two or more access devices, which has a second highest radio field intensity, in the case where a total number of luminaires that are connected to the access device having the highest radio field intensity exceeds a permissible number.

As described above, illumination controller 30 determines that the predetermined luminaire is to be paired with access device 21 having the second highest radio field intensity when the total number of luminaires connected to access device 22 exceeds the permissible number. As such, it is possible to efficiently perform pairing between luminaires 1 to 10 and access devices 21 and 22.

Further, the identification information of each of the plurality of luminaires may be a media access control (MAC) address of each of the plurality of luminaires, and the pairing method may further include: assigning, by illumination controller 30, a communication address to each of the plurality of luminaires, the communication address being smaller than the MAC address in number of bits.

As described above, by using communication addresses each having a smaller number of bits for communication between luminaires 1 to 10 and access devices 21 and 22, it is possible to increase the speed of communication performed after the pairing.

The pairing method may further include: after receiving and checking the first information transmitted as the reply from the two or more luminaires, transmitting, by each of the plurality of access devices, a reception signal to the two or more luminaires; and storing, by the two or more luminaires which have received the reception signal, information indicating that the first information has been transmitted as the reply to the one or more access devices.

According to this, for example, even when the first command signal is transmitted from access device 21, the reply can be omitted in the case where the information indicating that the luminaire has transmitted the first information as a reply to access device 21 is stored in the luminaire. With this, it is possible to efficiently perform pairing between luminaires 1 to 10 and access devices 21 and 22.

Each of the plurality of luminaires may transmit the first information as the reply, when the first information has not been transmitted as the reply to the one or more access devices, and each of the plurality of luminaires need not transmit the first information as the reply, when the first information has already been transmitted as the reply to the one or more access devices.

According to this, for example, when the first command signal is transmitted a plurality of times from access device 21, the number of times reply is performed by the luminaires can be reduced. As such, it is possible to efficiently perform pairing between luminaires 1 to 10 and access devices 21 and 22.

Further, the information indicating that the first information has been transmitted as a reply may be stored by holding a reply completion flag which is a sign indicating that the first information has been transmitted as the reply to the one or more access devices.

According to this, for example, even when the first command signal is transmitted from access device 21, the reply can be omitted in the case where the reply completion flag is held in the luminaires. With this, it is possible to efficiently perform pairing between luminaires 1 to 10 and access devices 21 and 22.

Further, each of the plurality of luminaires may transmit the first information as the reply, when the reply completion flag corresponding to the one or more access devices is not held in each of the plurality of luminaires, and each of the plurality of luminaires need not transmit the first information as the reply, when the reply completion flag corresponding to the one or more access devices is held in each of the plurality of luminaires.

According to this, for example, when the first command signal is transmitted a plurality of times from access device 21, the number of times reply is performed by luminaires 1 to 10 can be reduced. As such, it is possible to efficiently perform pairing between luminaires 1 to 10 and access devices 21 and 22.

Illumination system 100 according to the present embodiment is illumination system 100 including: a plurality of luminaires 1-10; a plurality of access devices 21 and 22 that wirelessly communicate with the plurality of luminaires 1-10; and illumination controller 30 that communicates with the plurality of access devices 21 and 22. Each of the plurality of luminaires 1-10 includes: communication unit 10a configured to communicate with one or more access devices included in the plurality of access devices; and controller 10c that transmits, to the one or more access devices via communication unit 10a of the luminaire, first information including identification information of the luminaire and a radio field intensity of a signal broadcasted from the one or more access devices. Each of the plurality of access devices 21 and 22 includes: communication unit 20b configured to communicate with illumination controller 30; and controller 20c that transmits, to illumination controller 30 via communication unit 20b of the access device, second information including identification information of the access device and a plurality of pieces of the first information. Illumination controller 30 includes: communication unit 30a configured to communicate with the plurality of access devices; and controller 30c. Controller 30c: determines, based on a plurality of pieces of the second information obtained via communication unit 30a of illumination controller 30, whether or not a predetermined luminaire included in the plurality of luminaires 1-10 has transmitted the first information to two or more access devices included in the plurality of access devices; determines, when determining that the predetermined luminaire (for example, luminaire 1) has transmitted the first information to only one access device (for example, access device 21) included in the plurality of access devices 21 and 22, that predetermined luminaire 1 and one access device 21 are to be paired; and determines, when determining that the predetermined luminaire (for example, luminaire 4) has transmitted the first information to two or more access devices 21 and 22 included in the plurality of access devices 21 and 22, that predetermined luminaire 4 and an access device (for example, access device 21) included in two or more access devices 21 and 22 which has a highest radio field intensity are to be paired.

As described above, illumination controller 30 of illumination system 100 determines whether or not the predetermined luminaire has transmitted the first information to a plurality of access devices, and determines a pairing partner according to a result of the determination. As such, it is possible to efficiently perform pairing between luminaires 1 to 10 and access devices 21 and 22.

Illumination controller 30 according to the present embodiment is illumination controller 30 that communicates with a plurality of access devices 21 and 22 that wirelessly communicate with a plurality of luminaires 1-10. Illumination controller 30 includes: communication unit 30a configured to receive, from the plurality of access devices 21 and 22, a plurality of pieces of second information that include (i) a plurality of pieces of first information that include (i-1) identification information of each of the plurality of luminaires 1-10 and (i-2) radio field intensities of signals broadcasted from the plurality of access devices 21 and 22 to the plurality of luminaires 1-10, and (ii) identification information of each of the plurality of access devices 21 and 22; and controller 30c. Controller 30c: determines, based on the plurality of pieces of the second information obtained via communication unit 30a, whether or not a predetermined luminaire included in the plurality of luminaires 1-10 has transmitted the first information to two or more access devices included in the plurality of access devices; determines, when determining that the predetermined luminaire (for example, luminaire 1) has transmitted the first information to only one access device (for example, access device 21) included in the plurality of access devices 21 and 22, that predetermined luminaire 1 and one access device 21 are to be paired; and determines, when determining that the predetermined luminaire (for example, luminaire 4) has transmitted the first information to the two or more access devices included in the plurality of access devices 21 and 22, that predetermined luminaire 4 and an access device (for example, access device 21) included in the two or more access devices which has a highest radio field intensity are to be paired.

Other Embodiments

Although illumination controller 30, illumination system 100, and a pairing method in illumination system 100 have been described above based on an embodiment, the present disclosure is not limited to the above embodiment. For example, forms obtained by various modifications to the above embodiment that can be conceived by a person of skill in the art as well as forms realized by arbitrarily combining structural components and functions in the above embodiment, which are within the scope of the essence of the present disclosure are included in the present disclosure.

For example, regarding the timing at which the first information is transmitted as a reply, when luminaire 1 and another luminaire 2 have simultaneously transmitted the first information as a reply, access device 21 may transmit a first command signal to luminaires 1 and 2 that have simultaneously transmitted the first information, to cause luminaires 1 and 2 to generate a random number again. According to this, even when luminaires have simultaneously transmitted the first information as a reply, the first information is transmitted again as a reply in response to the next first command signal, and thus, it is possible to reliably obtain the first information of each of luminaires 1 to 10.

Moreover, regarding the transmission of the first information to access device 21 as a reply, the luminaires may be programmed such that a luminaire already holding the reply completion flag does not transmit the first information as a reply. That is to say, in the embodiment, each of a plurality of luminaires (for example, luminaires 1 to 6) which have received the first command signal from access device 21 transmits the first information as a reply to access device 21 when not holding the reply completion flag corresponding to access device 21, and need not transmit the first information as a reply to access device 21 when holding the reply completion flag corresponding to access device 21. According to this configuration, it is possible to reduce the number of times the reply is performed by luminaires 1 to 6, even when access device 21 has transmitted the first command signal a plurality of times.

Further, access device 21 may transmit the first command signal until access device 21 receives no more reply from luminaires 1 to 10, that is, until all of luminaires 1 to 10 hold the reply completion flag. According to this, access device 21 can reliably obtain the first information from each of luminaires 1 to 10.

Furthermore, although access device 21 and access device 22 may sequentially transmit the second information to illumination controller 30 in the stated order, the present disclosure is not limited to this. After temporarily holding the information, access devices 21 and 22 may transmit the information to illumination controller 30 all at once.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A pairing method in an illumination system including: a plurality of luminaires; a plurality of access devices; and an illumination controller that communicates with the plurality of access devices, the pairing method comprising:
broadcasting, by each of the plurality of access devices, a first command signal to parts of the plurality of luminaires, the first command signal commanding each of the parts of the plurality of luminaires that receive the first command signal to transmit information regarding the each of the parts of the plurality of luminaires as a reply;
receiving, by each of the plurality of luminaires, one or more command signals including the first command signals broadcasted from one or more access devices;
after receiving the first command signal, transmitting, by each of the plurality of luminaires, first information as the reply to one or more access devices among the plurality of access devices, each of which has broadcasted the first command signal, the first information including identification information of the each of the plurality of luminaires and a radio field intensity of the first command signal received by the each of the plurality of luminaires;
after receiving a plurality of pieces of the first information, transmitting, by each of the plurality of access devices, second information to the illumination controller, the second information including identification information of each of the plurality of access devices and the plurality of pieces of the first information received by the each of the plurality of access devices; and
after receiving a plurality of pieces of the second information, pairing, by the illumination controller, based on the plurality of pieces of the second information, each of the plurality of luminaires and one of the plurality of access devices, wherein:

in the pairing, the illumination controller determines whether a given luminaire to be paired has transmitted the first information to only one access device or to two or more access devices, among the plurality of access devices, when it is determined that the given luminaire to be paired has transmitted the first information to only one access device included in the plurality of access devices, the illumination controller determines to pair the given luminaire and the one access device, and when it is determined that the given luminaire to be paired has transmitted the first information to the two or more access devices included in the plurality of access devices, the illumination controller determines to pair the given luminaire and one access device included in the two or more access devices which has a highest radio field intensity.

2. The pairing method according to claim 1, wherein the illumination controller pairs the given luminaire and the one access device, after determining that a total number of luminaires that are connected to the one access device is within a permissible number.

3. The pairing method according to claim 1, wherein the illumination controller pairs the given luminaire and the one access device having the highest radio field intensity, after determining that a total number of luminaires that are connected to the one access device having the highest radio field intensity is within a permissible number.

4. The pairing method according to claim 1, wherein:
when it is determined that the given luminaire to be paired has transmitted the first information to the two or more access devices included in the plurality of access devices, the illumination controller pairs the given luminaire and an access device, among the two or more access devices, which has a second highest radio field intensity, in the case where a total number of luminaires that are connected to the access device having the highest radio field intensity exceeds a permissible number.

5. The pairing method according to claim 1, wherein:
the identification information of each of the plurality of luminaires is a media access control (MAC) address of each of the plurality of luminaires, and
the pairing method further comprises:
assigning, by the illumination controller, a communication address to each of the plurality of luminaires, the communication address being smaller than the MAC address in number of bits.

6. The pairing method according to claim 1, further comprising:
after receiving and checking the first information transmitted as the reply from the two or more luminaires, transmitting, by each of the plurality of access devices, a reception signal to the two or more luminaires; and
storing, by the two or more luminaires which have received the reception signal, information indicating that the first information has been transmitted as the reply to the one or more access devices.

7. The pairing method according to claim 6, wherein:
each of the plurality of luminaires transmits the first information as the reply, when the first information has not been transmitted as the reply to the one or more access devices, and
each of the plurality of luminaires does not transmit the first information as the reply, when the first information has already been transmitted as the reply to the one or more access devices.

8. The pairing method according to claim 6, wherein
the information indicating that the first information has been transmitted as a reply is stored by holding a reply completion flag which is a sign indicating that the first information has been transmitted as the reply to the one or more access devices.

9. The pairing method according to claim 8, wherein:
each of the plurality of luminaires transmits the first information as the reply, when the reply completion flag corresponding to the one or more access devices is not held in each of the plurality of luminaires, and
each of the plurality of luminaires does not transmit the first information as the reply, when the reply completion flag corresponding to the one or more access devices is held in each of the plurality of luminaires.

10. An illumination system comprising:
a plurality of luminaires;
a plurality of access devices that wirelessly communicate with the plurality of luminaires; and
an illumination controller that communicates with the plurality of access devices,
wherein each of the plurality of luminaires includes:
a communication unit configured to communicate with one or more access devices included in the plurality of access devices; and
a controller that transmits, to the one or more access devices via the communication unit of the luminaire, first information including identification information of the luminaire and a radio field intensity of a signal broadcasted from the one or more access devices,
each of the plurality of access devices includes:
a communication unit configured to communicate with the illumination controller; and
a controller that transmits, to the illumination controller via the communication unit of the access device, second information including identification information of the access device and a plurality of pieces of the first information, and
the illumination controller includes:
a communication unit configured to communicate with the plurality of access devices; and
a controller that
determines, based on a plurality of pieces of the second information obtained via the communication unit of the illumination controller, whether or not a predetermined luminaire included in the plurality of luminaires has transmitted the first information to two or more access devices included in the plurality of access devices,
determines, when determining that the predetermined luminaire has transmitted the first information to only one access device included in the plurality of access devices, that the predetermined luminaire and the one access device are to be paired, and
determines, when determining that the predetermined luminaire has transmitted the first information to the two or more access devices included in the plurality of access devices, that the predetermined luminaire and one access device included in the two or more access devices which has a highest radio field intensity are to be paired.

11. An illumination controller that communicates with a plurality of access devices that wirelessly communicate with a plurality of luminaires, the illumination controller comprising:
- a communication unit configured to receive, from the plurality of access devices, a plurality of pieces of second information that include
  - (i) a plurality of pieces of first information that include (i-1) identification information of each of the plurality of luminaires and (i-2) radio field intensities of signals broadcasted from the plurality of access devices to the plurality of luminaires, and
  - (ii) identification information of each of the plurality of access devices; and
- a controller that
- determines, based on the plurality of pieces of the second information obtained via the communication unit, whether or not a predetermined luminaire included in the plurality of luminaires has transmitted the first information to two or more access devices included in the plurality of access devices,
- determines, when determining that the predetermined luminaire has transmitted the first information to only one access device included in the plurality of access devices, that the predetermined luminaire and the one access device are to be paired, and
- determines, when determining that the predetermined luminaire has transmitted the first information to the two or more access devices included in the plurality of access devices, that the predetermined luminaire and one access device included in the two or more access devices which has a highest radio field intensity are to be paired.

* * * * *